(12) United States Patent
Kochanski et al.

(10) Patent No.: US 6,784,364 B2
(45) Date of Patent: Aug. 31, 2004

(54) PORTABLE OFFICE STORAGE UNIT

(75) Inventors: Walter T. Kochanski, Fort Wayne, IN (US); Frank Roe, Wolcottville, IN (US); Curtis G. Berndt, Fremont, IN (US); Randall L. Bixler, Lagrange, IN (US)

(73) Assignee: Pent Technologies, Inc., Kendallville, IN (US)

( * ) Notice: Subject to any disclaimer, the term of this patent is extended or adjusted under 35 U.S.C. 154(b) by 0 days.

(21) Appl. No.: 10/157,167

(22) Filed: May 29, 2002

(65) Prior Publication Data

US 2003/0217857 A1 Nov. 27, 2003

Related U.S. Application Data

(60) Provisional application No. 60/330,389, filed on Oct. 18, 2001.

(51) Int. Cl.[7] ................................................ H02G 3/04
(52) U.S. Cl. ..................... 174/48; 174/50; 220/4.02; 248/906; 439/535
(58) Field of Search ................... 174/48, 50; 220/4.02, 220/3.8; 439/535; 248/906

(56) References Cited

U.S. PATENT DOCUMENTS

| | | | |
|---|---|---|---|
| D180,251 S | 5/1957 | Stiffel | D48/19 |
| 2,925,236 A | 2/1960 | Cook et al. | 248/276 |
| 3,072,784 A | 1/1963 | Mann | 240/81 |
| 3,519,293 A | 7/1970 | Henning et al. | 287/58 |
| 3,610,884 A | * 10/1971 | Evans et al. | 219/439 |
| 3,961,822 A | 6/1976 | Daniel | 297/423 |
| 4,682,452 A | 7/1987 | Propp et al. | 52/118 |
| 4,909,405 A | 3/1990 | Kerr, Jr. | 220/3.9 |
| 5,393,026 A | 2/1995 | Deschamps et al. | 248/343 |
| 6,077,086 A | 6/2000 | LaRoche | 439/32 |
| 6,133,843 A | * 10/2000 | Davidson | 340/693.9 |
| 6,518,500 B1 | * 2/2003 | Huang | 174/50 |
| 6,519,208 B2 | * 2/2003 | DeVries | 368/10 |
| 6,527,135 B1 | * 3/2003 | Braun et al. | 220/4.02 |

* cited by examiner

*Primary Examiner*—Dhiru R Patel
(74) *Attorney, Agent, or Firm*—Taylor & Aust, P.C.

(57) ABSTRACT

A portable storage unit has a body; a cavity in the body; an access opening in the body for providing access to the cavity, and a door which is hingedly fixed to the body for selectively opening and closing the cavity access opening. An extensible member is slidably received in the body and movable between a retracted position and a range of extended positions for securing the unit intermediate a pair of spaced apart surfaces such as a floor and underside of a desk. A spring urges the extensible member resiliently toward the extended positions. The extensible member may be latched in the retracted position and the body has a handle for transporting the unit between sites. Electrical connectors such as communication ports or electrical receptacles may be mounted to the unit along with one or more cords for supplying current to the electrical connectors.

21 Claims, 4 Drawing Sheets

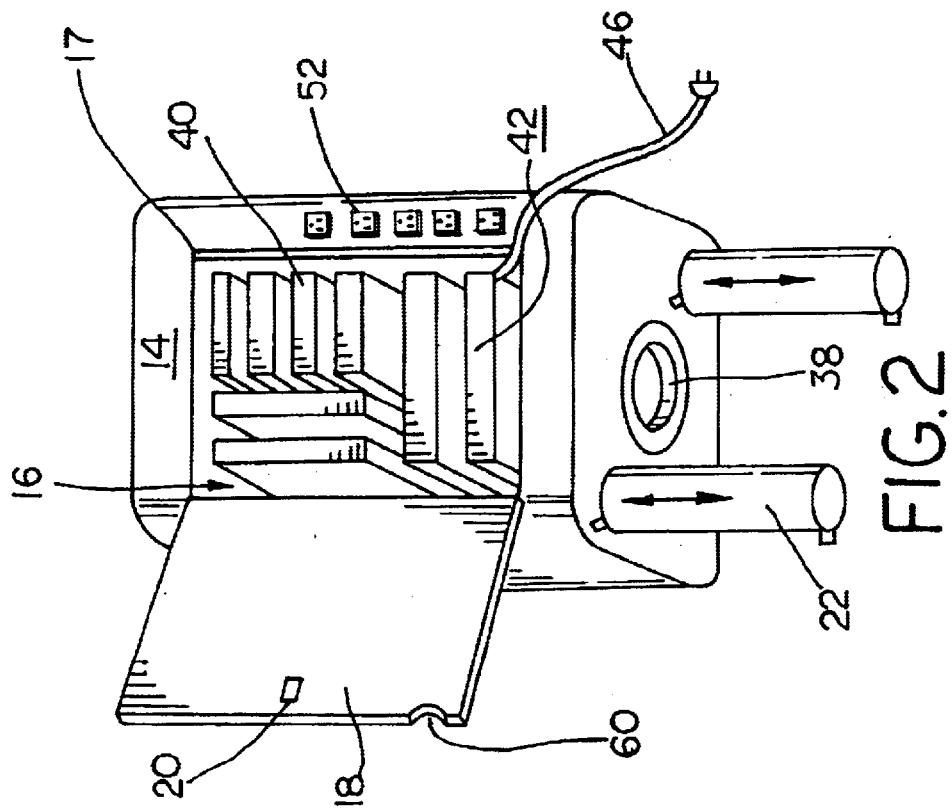
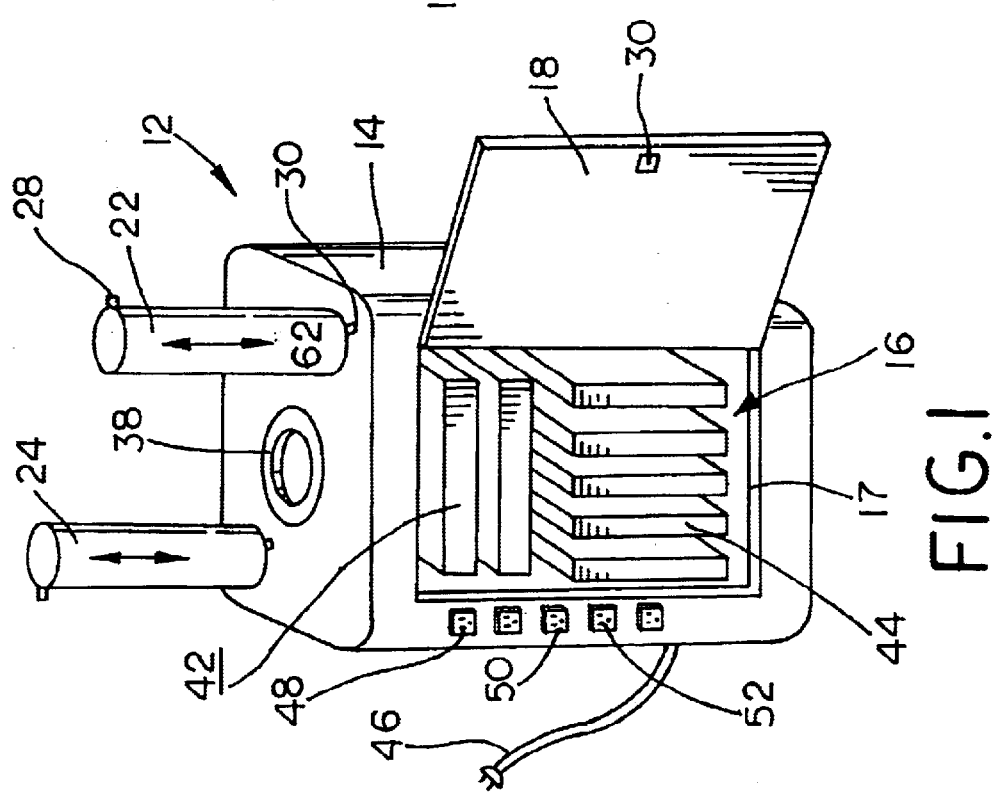

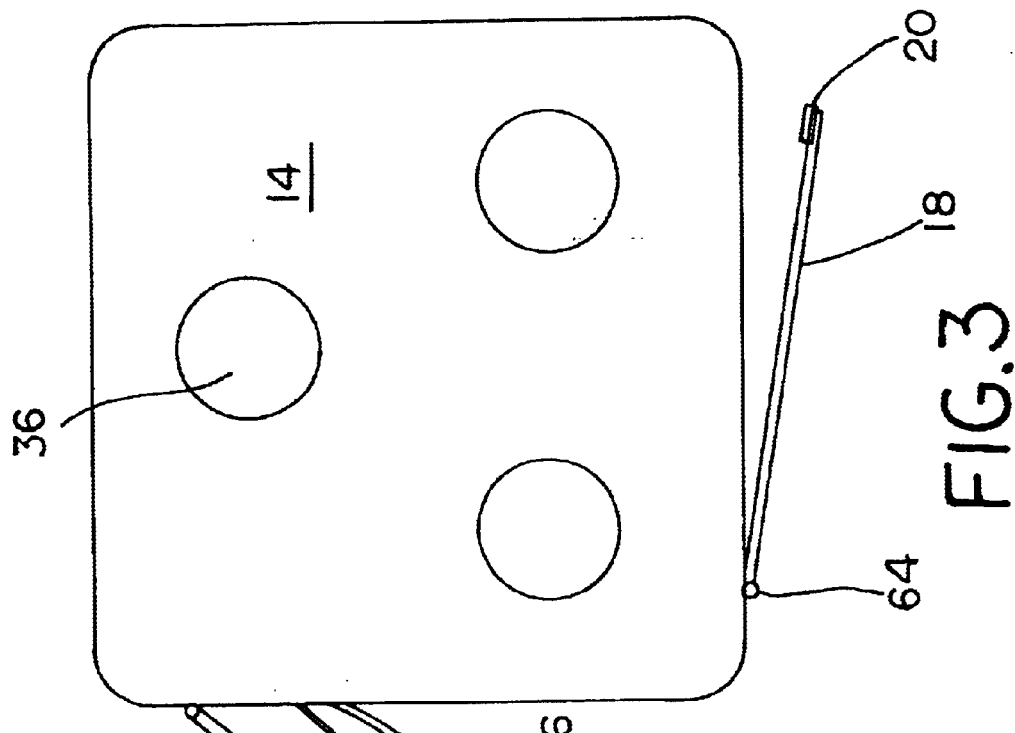
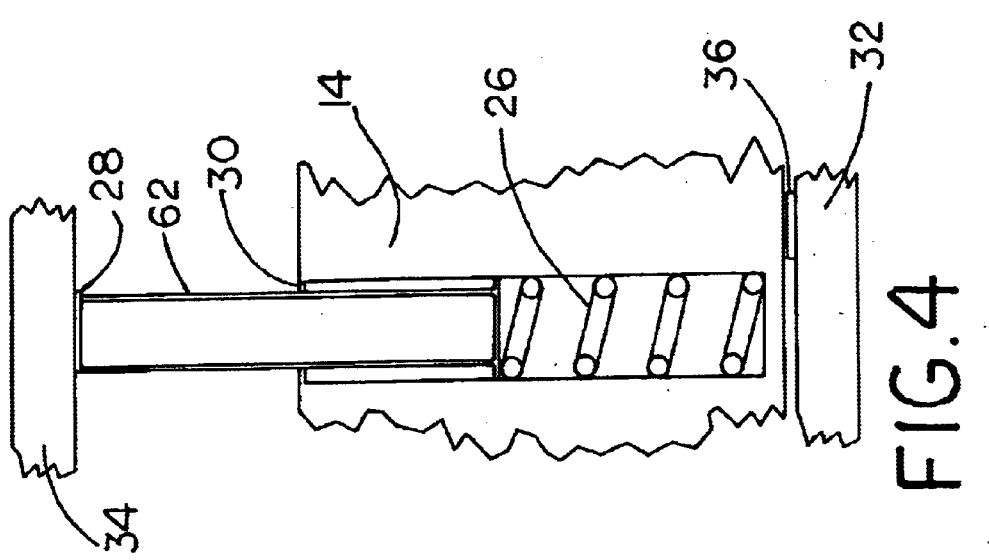

PORTABLE OFFICE STORAGE UNIT

CROSS REFERENCE TO RELATED APPLICATIONS

This is a non-provisional application based upon U.S. provisional patent application serial No. 60/330,389, entitled "ELECTRICAL DEVICE WITH SPRING LOADED HOUSING", filed Oct. 18, 2001.

BACKGROUND OF THE INVENTION

1. Field of the Invention

The present invention relates to modular furniture assemblies and more particularly to a modular furniture accessory useful for storing office paraphernalia in a readily accessible manner, as well as transporting the stored office paraphernalia between locations such as spaced apart work stations and the like typically found in modular office furniture environments and. optionally, providing additional transportable electrical outlets and communication ports at selected workstations.

2. Description of the Related Art

Modular wall panels, shelving and desks or other workspaces are commonplace in modular office furniture environments. Also common is the need for storage space for work related items including dictionaries and other books or notebooks, pencils, paper, tape, computer storage media and accessories, and the like as well as items such as purses, umbrellas, and other personal items frequently carried to and from a workstation, all herein termed office paraphernalia.

Office desks frequently have a variety of drawers for use by an office worker and almost as frequently, that drawer space is filled to capacity. A similar overcrowding problem applies to electrical receptacles provided near the desk which are frequently all or nearly all in use. It is highly desirable to provide additional storage space with optional additional electrical receptacles, and to be able to use the additional storage space as an instrumentality for moving stored items from one workstation to another.

SUMMARY OF THE INVENTION

The present invention provides portable office storage space, and, optionally, electrical outlets and communication ports without unnecessarily cluttering desktop areas or otherwise interfering with an efficient office environment.

The invention comprises, in one form thereof, a portable storage unit having a body with a cavity therein for receiving and storing office paraphernalia. The cavity has an access opening providing access to the cavity and a door is hingedly fixed to the body for selectively opening and closing the cavity access opening. The storage unit may be secured in position intermediate a pair of spaced apart surfaces such as the floor and underside of a desk, or an upper desk or shelf surface and a higher shelf under-surface by one or more extensible members which are slidably received in the body and movable between a retracted position and a range of extended positions.

An advantage of the present invention is that the storage unit may be positioned to provide additional storage space while not interfering with full utilization of the workspace.

Another advantage is the additional storage space may be secured in place yet easily moved to another location.

A further advantage is that easily transportable additional electrical and communication connections may be incorporated into the storage unit.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is an isometric view of a storage unit according to one form of the invention;

FIG. 2 is an isometric view of a storage unit similar to the unit of FIG. 1;

FIG. 3 is a cross-sectional view showing details of a telescoping storage unit leg;

FIG. 4 is a top view of a storage unit similar to the unit of FIG. 2;

DETAILED DESCRIPTION OF THE INVENTION

Figure 5:
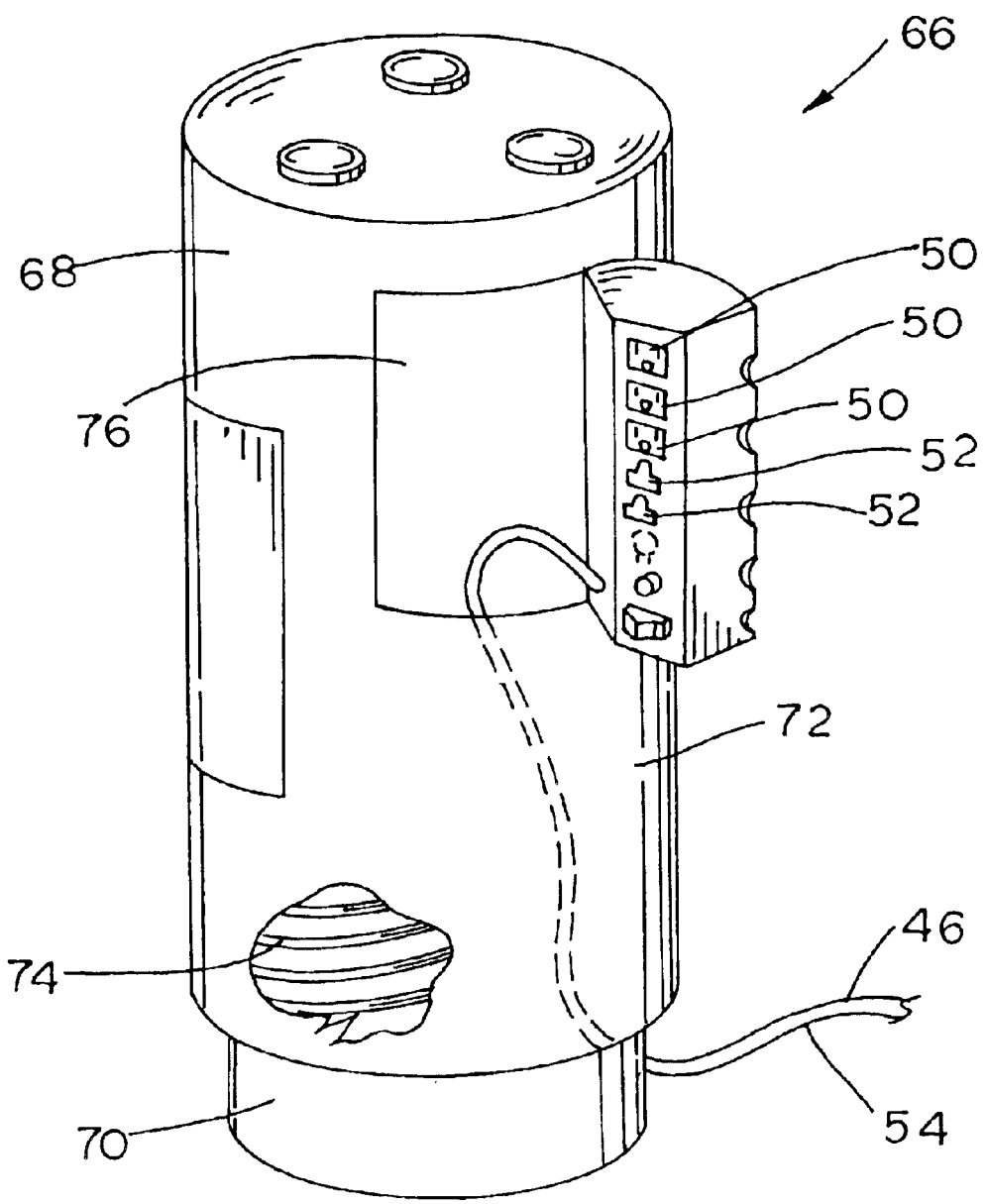
FIG. 5 is an isometric view of another embodiment of the present invention.

Referring now to FIG. 1, there is shown a portable storage unit or assembly 12 inculding a storage unit cavity 16 for receiving and storing office paraphernalia. The paraphernalia may be placed in drawers such as 40 and 42, while part of the cavity may provide space for books, files, notebooks and the like as at 44. Numerous other allocation of the space within the cavity are possible. There is a cavity access opening 17 in body 14 for providing access to cavity 16. A storage unit door 18 is fixed to the body for selectively opening and closing the cavity access opening by a hinge 64 (FIG. 3). A door latch 20 secures the door in its closed position.

The unit may be secured in position between a pair of surfaces by one or more extensible members or legs 22 and 24 which are slidably received in the body and movable between a retracted position and a range of extended positions for securing the unit intermediate a pair of spaced apart, generally parallel, horizontal upper and lower surfaces. The lower surface may, for example, comprise a floor or desk 32 (FIG. 4) and the upper surface may comprise either a desktop or shelf 34 (FIG. 4). The storage unit may be fixed in place with the extensible members 22 and 24 extending upwardly as in FIG. 1, or with the extensible members serving as legs to elevate the unit and cavity access opening to a more convenient height as in FIG. 2. Of course, the orientation of the drawer cavities differs between the two views. The extensible members are both resiliently biased in the same direction (upwardly as viewed in FIG. 1) and toward their respective extended positions. The extended positions encompass a range to accommodate various surface spacings. Each extensible member has a movable ram portion 62 which is resiliently biased by a spring 26 toward the extended position as shown in FIG. 4. In the retracted position, the extensible members 22 and 24 lie substantially entirely within the body.

A leg latch arrangement 28, 30 secures the extensible member rams against their resilient bias in the retracted position as best seen by comparing FIGS. 1 and 4. The latching arrangement may include a tab 28 which extends radially from the ram 62 near the free end thereof. This tab 28 passes through a notch 30 in the body when the ram is in the proper angular orientation and collapsed against the spring 26 into the body 14. Rotation of the ram after the tab passes through the notch locks the ram in its retracted position ready for transport. The ram could also be locked in an extended position or held in its retracted position by any suitable selectively engagable friction arrangement. Numerous other suitable locking or latching arrangements are available.

While rounded somewhat at the edges, the storage unit body has the general shape of a rectangular parallelepiped with a pair of opposed faces one of which is visible in FIGS. 1 and 2 and receives the extensible members, and the other of which is visible in FIG. 3 and is adapted to engage one of the two spaced apart surfaces. As best seen in FIGS. 3 and 4, the surface engaging face may include a friction surface region such as pads 36. A third face, which lies orthogonal to the pair, includes the door 18.

A handle 38 which facilitates transportation of the unit from one location to another location is generally annular and hingedly affixed to the unit body 14 along one annulus edge. In the position shown, the handle is nearly flush with or recessed in the body surface. but may be raised and grasped for transporting the unit between worksites. Of course, body 14 may be provided with a handle of any desired shape at any selected position or orientation. Alternatively, a handle may interconnect the ends of extensible members ZZ and ZA, and also act as a bearing surface when so configured.

A series of electrical receptacles such as duplex outlets 48 and 50 may be mounted in a unit face such as the face containing the door 18 and a power-in cord 46 passing through a conventional grommet in another unit wall is available for connecting the receptacles to a source of electrical energy. A communication port 52 with appropriate input wiring may also be provided all as shown in FIG. 1.

FIG. 2 illustrates a variation on this concept where the power-in cord 46 passes through the cavity access opening and the door 18 includes a notch or cord passing aperture 60 which allows the door to be closed with the cord 46 extending from the cavity opening. This variation allows the power-in cord to be conveniently stowed in the cavity during transport of the unit between worksites.

FIG. 3 carries the concept of the cord passing aperture a step further. Power receptacles 58 are now located within the storage unit body, for example, on an inner surface of a second or wiring access door 56. Cord passing apertures such as 60 in FIG. 2 may be located along the edge of door 56 to allow entry of a power-in cord 46, a coaxial or other communication connection 54 in the event a communication port mounted interior of the unit. and passage of equipment power and communication cords to connect to the interior receptacles or ports, all while door 56 is closed.

In summary, the body and extensible members 22 and 24 cooperate to capture the unit 12 intermediate the floor and a desk surface or a desk surface and a shelf surface. The extensible members 22 and 24 may be compressed into the body 14 and latched in position by the locking arrangement 28, 30, the handle 38 raised and grasped to move the storage unit from one location to another with the contents in tact. Supplemental power or communications connections may be provided outside or within the storage unit. In the event those connections are interior, cord passing notches along an edge of the door allow electrical connection to the connectors through the cavity access opening independent of the door position.

Figure 6:
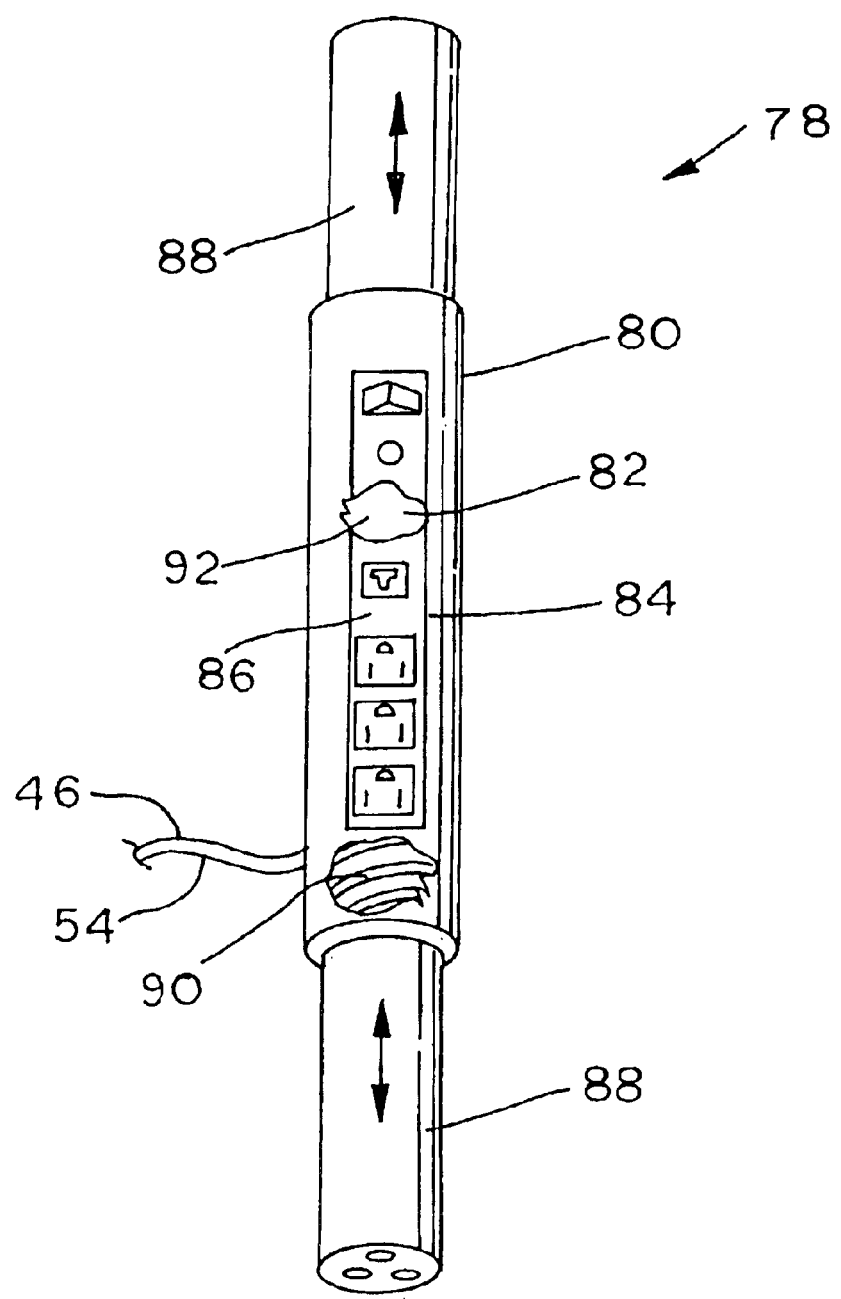
FIG. 6 is an isometric, partially fragmentary view of another embodiment of the present invention.

Portable storage unit 66 (FIG. 5) includes elongate member 68 with male member 70 slidingly coupled with female member 72 in a longitudinal direction of elongate member 66. Biasing element 74 is interposed between male member 68 and female member 72 in the longitudinal direction of elongate member 68. Portable storage unit 66 includes storage unit 76 in elongate member 68. Portable storage unit 78 (FIG. 6) includes body 80, cavity 82 in body 80, cavity access opening 84 and door 86 attached to body 80 for selectively opening and closing cavity access opening 84. Two extensible members 88 are slidably received in body 80 and are movable between a retracted position and a range of extended positions for securing the portable storage unit intermediate a pair of spaced apart surfaces (not shown), all extensible members 88 being resiliently biased as shown at 90. Storage unit 92 is in said cavity 82. The embodiments of FIGS. 5 and 6 can include power-in-cord 46, communications cord 54, receptacles 50 and communications port 52.

What is claimed is:

1. A portable storage unit comprising:
   a body;
   a cavity in the body for receiving and storing office paraphernalia;
   a cavity access opening in the body for providing access to the cavity;
   a door hingedly fixed to the body for selectively opening and closing the cavity access opening; and
   an extensible member slidably received in the body and movable between a retracted position and a range of extended positions for securing the portable storage unit intermediate a pair of spaced apart surfaces.

2. The unit of claim 1, wherein the extensible member is resiliently biased toward the extended positions.

3. The unit of claim 2, further including a latch arrangement for securing the extensible member against the resilient bias in the retracted position.

4. The unit of claim 2, further comprising a second extensible member slidably received in the body and movable between a retracted position and a range of extended positions for securing the unit intermediate a pair of spaced apart surfaces, the second extensible member being resiliently biased toward the extended positions and the first and second extensible members being resiliently biased in substantially the same direction.

5. The unit of claim 1, wherein the body has the general shape of a rectangular parallelepiped with a pair of opposed faces, one face receiving the extensible member and the other face adapted to engage one of the two spaced apart surfaces.

6. The unit of claim 5, wherein said other face includes a friction surface region for engaging one of the two spaced apart surfaces.

7. The unit of claim 1, wherein, in the retracted position, the extensible member lies substantially entirely within the body.

8. The unit of claim 1, further including a handle for facilitating transportation of the unit from one location to another location.

9. The unit of claim 1, wherein the pair of spaced apart surfaces comprise two of: a floor, a desk surface and a shelf surface; and the body and extensible member cooperate to capture the unit intermediate the floor and desk surface or the desk surface and shelf surface.

10. The unit of claim 1, further comprising at least one power receptacle mounted to the unit and a power-in cord for connecting the receptacle to a source of electrical energy.

11. The unit of claim 10, wherein the power receptacle is mounted interior of the body, and further comprising a cord passing aperture for allowing an electrical cord to enter the body and be coupled to the receptacle.

12. The unit of claim 1, further comprising at least one communication port mounted to the unit and a communication connecting cord for coupling the communication port to another communication line.

13. The unit of claim 12, wherein the communication port is mounted interior of the body, and further comprising a communication cord passing aperture for allowing a communication connecting cord to enter the body and be coupled to the receptacle.

14. A portable storage unit comprising:
   a body;
   a cavity in the body;
   a cavity access opening in the body for providing access to the cavity;
   a door hingedly fixed to the body for selectively opening and closing the cavity access opening;
   an extensible member slidably received in the body and movable between a retracted position and a range of extended positions for securing the portable storage unit intermediate a pair of spaced apart surfaces; and
   a spring urging the extensible member resiliently toward the extended positions.

15. The unit of claim 14, further comprising a second extensible member slidably received in the body and movable between a retracted position and a range of extended positions for securing the unit intermediate a pair of spaced apart surfaces, the second extensible member being resiliently biased toward the extended positions and the first and second extensible members being resiliently biased in substantially the same direction.

16. The unit of claim 14, wherein the pair of spaced apart surfaces comprise two of: a floor, a desk surface and a shelf surface; and the body and extensible member cooperate to capture the unit intermediate the floor and desk surface or the desk surface and shelf surface.

17. A portable storage unit comprising:
   a body;
   a cavity in the body;
   a cavity access opening in the body for providing access to the cavity;
   a door hingedly fixed to the body for selectively opening and closing the cavity access opening;
   an electrical connector mounted to the unit;
   a cord for supplying current to the electrical connector; and
   an extensible member slidably received in the body and movable between a retracted position and a range of extended positions for securing the portable storage unit intermediate a pair of spaced apart surfaces.

18. The unit of claim 17, wherein the electrical connector comprises a power outlet receptacle mounted interior of the unit, the cord comprises a power-in cord for connection to a source of electrical energy, and further comprising a cord passing aperture for allowing an electrical cord to enter the body and be coupled to the receptacle.

19. The unit of claim 17, wherein the electrical connector comprises a communication port mounted interior of the unit, the cord comprises a communication connecting cord for coupling the communication port to another communication line, and further comprising a communication cord passing aperture for allowing a communication cord to enter the body and be coupled to the port.

20. The unit of claim 17, wherein the electrical connector is mounted interior of the unit and further comprising a cord passing notch along an edge of the door for allowing electrical connection to the connector through the cavity access opening independent of the door position.

21. A portable storage unit, comprising:
   an elongate member including a male member slidingly coupled with a female member in a longitudinal direction of said elongate member,
   a biasing element interposed between said male member and said female member in said longitudinal direction; and
   a storage unit in said elongate member.

* * * * *